United States Patent Office 3,039,192
Patented June 19, 1962

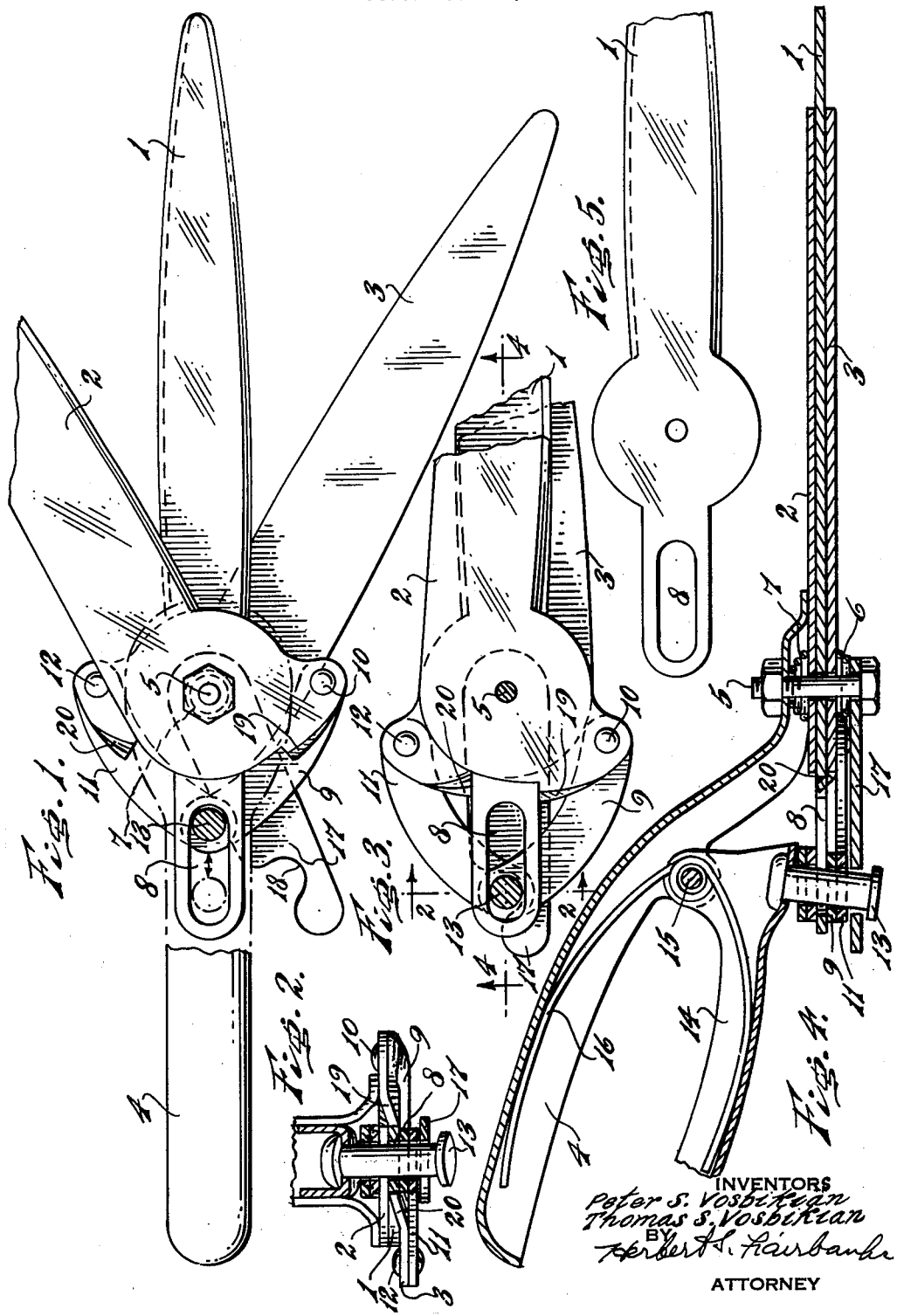

1

3,039,192
SHEARS
Peter S. Vosbikian, Melrose, Pa. (20th and Oxford Sts., Philadelphia, Pa.), and Thomas S. Vosbikian, 20th and Oxford Sts., Philadelphia, Pa.
Filed Nov. 30, 1961, Ser. No. 156,092
6 Claims. (Cl. 30—213)

The object of our present invention is to devise a novel construction and arrangement of shears wherein a central stationary blade has cutting edges at opposite sides cooperating with movable side blades to which one end of links are connected, the other ends of said links being connected with a pivot having the functions of maintaining the central blade in a stationary condition and of connecting the links to a movable handle. The blades are pivotally mounted on an upper handle.

A further object of the invention is to devise novel means for locking the movable blades in closed position.

With the foregoing and other objects in view as will hereinafter clearly appear, our invention comprehends a novel arrangement and construction of shears having novel means for maintaining a central blade stationary and for linking the movable blades with a movable handle.

It further comprehends novel three bladed shears wherein the pivot for the linkage of a stationary blade is movable in a slot in a central stationary blade and a locking member on the pivot connecting the blades with a stationary handle has a locking member which interlocks with the pivot of the movable blades linkage to lock the blades in closed position.

For the purpose of illustrating the invention, we have shown in the accompanying drawings a preferred embodiment of it which we have found in practice to give satisfactory and reliable results. It is, however, to be understood that the various instrumentalities of which the invention consists can be variously arranged and organized, and the invention is not limited, except by the scope of the appended claims, to the exact arrangement and organization of these instrumentalities as herein illustrated.

FIGURE 1 is a top plan view of three bladed shears embodying our invention with the movable blades in their open position.

FIGURE 2 is a section on line 2—2 of FIGURE 3.

FIGURE 3 is a transverse section through the pivots for the blades and the linkage pivots with the handles removed and the blades partly broken away.

FIGURE 4 is a section taken on line 4—4 of FIGURE 3 with the upper stationary handle and the lower movable handle in assembled positions.

FIGURE 5 is a top plan view of a portion of the stationary blade.

Similar numerals of reference indicate corresponding parts.

Referring to the drawings:

The shears has three blades, a stationary central blade 1 and side movable blades 2 and 3, the blades being connected with a bottom disclike portion of an upper stationary handle 4 by a pivot 5. The pivot 5 as shown consists of a bolt and nut with a spring 6 between the head of the bolt and the lower movable blade 3, and with a spring 7 between the nut and the upper handle.

2

The stationary blade 1 has a longitudinally extending slot 8 in rear of its pivotal point and at the longitudinal axis of the blade.

A link 9 is pivoted at one end at 10 to an offset portion of the upper movable blade 2, and in a similar manner a link 11 is pivoted at 12 to an offset portion of the lower movable blade 3. The rear ends of the links are connected by a pivot 13 slidable in the slot 8 of the stationary blade 1 and connected with the lower movable handle 14 which is pivoted at 15 to the upper stationary handle 4.

The grasping portions of the handles are half-round in cross section and contain a spring 16 coiled around the handle pivot 15 and bearing against said grasping portions to effect the opening movement of the movable blades.

The blades are locked in their closed positions by a locking member 17 in the form of a bar loosely mounted on the pivot 5 and having a slot 18 to receive the pivot 13.

One side edge of the stationary blade is bevelled upwardly and the opposite side edge bevelled downwardly to provide cutting edges for cooperation with the cutting edges of the movable blades.

In the operation, the linkage pivot limits the opening and closing movements of the movable blades by its contact with an end of the slot 8 of the stationary blade 1; it maintains the blade 1 in a stationary condition; it connects the links with the movable handle; and it serves as a portion of the locking means for retaining the movable blades in their closed position.

The preferred manner of limiting the extent of closing movements of the movable blades is shown in FIGURE 3, whereupon the upper movable blade 2 has an offset downward projection 19 and the movable blade 3 has an offset upward projection 20 which contact the sides of the stationary blade 1 and thus limit the extent of closing movements of the movable blades.

Having thus described our invention, what we claim as new and desire to secure by Letters Patent is:

1. Shears, comprising a central blade, a movable side blade above said central blade, a side movable blade beneath said central blade, a stationary handle to which said blades are pivotally connected, said central blade having in rear of its pivotal connection a longitudinally extending slot, separate links pivotally connected at one end with the movable blades, a movable handle pivoted to the stationary handle, and a pivot pivotally connecting the links with the movable handle and extending through said slot to maintain said central blade in a stationary position.

2. The means defined in claim 1, wherein the ends of said slot limit the extent of longitudinal movement therein to limit the extent of opening and closing movements of the movable blades.

3. The construction defined in claim 1, wherein the central blade has one side edge bevelled upwardly and the other side edge bevelled downwardly to cooperate with the movable blades.

4. The means defined in claim 1, wherein spring means at the pivotal portions of the blades tension the blades against each other.

5. The means defined in claim 1, wherein a locking member on the pivotal connection of the blades with the stationary handle interlocks with the pivot connecting the links and movable handle to maintain the movable blades in closed condition.

6. Shears comprising a central stationary blade having a longitudinal slot at its rear portion, an upper movable blade, a lower movable blade, a stationary handle to which said blades are pivoted, links having at one end an offset pivotal connection with the rear portions of the movable blades, a pivot connecting the other ends of said links and extending into said slot in the stationary blade, movable handle connected with said pivot and pivotally connected with the upper handle, each of said movable blades having an offset projection contacting opposite sides of the stationary blade to limit the extent of closing movements of the movable blades.

References Cited in the file of this patent

UNITED STATES PATENTS

| | | |
|---|---|---|
| 284,968 | Lindsey | Sept. 11, 1883 |
| 1,254,284 | Southwood | Jan. 22, 1918 |
| 1,287,754 | Robertson | Dec. 17, 1918 |
| 1,891,694 | Svendsgaard | Dec. 20, 1932 |
| 2,736,961 | Howell | Mar. 6, 1956 |